Oct. 27, 1959 L. R. F. HARRIS 2,910,541

TIME-DIVISION MULTIPLEX COMMUNICATION SYSTEMS

Filed Nov. 9, 1953 5 Sheets-Sheet 1

INVENTOR
Lionel R. F. Harris,
BY Hall & Houghton
ATTORNEY

TIME-DIVISION MULTIPLEX COMMUNICATION SYSTEMS

Filed Nov. 9, 1953 5 Sheets-Sheet 2

INVENTOR
Lionel R. F. Harris,
BY Hall & Houghton
ATTORNEY

ARRANGEMENTS OF SWITCH

INVENTOR
Lionel R.F. Harris
BY Hall & Houghton
ATTORNEY

TIME-DIVISION MULTIPLEX COMMUNICATION SYSTEMS

INVENTOR
Lionel R. F. Harris
BY Hall & Houghton
ATTORNEY

Oct. 27, 1959 L. R. F. HARRIS 2,910,541

TIME-DIVISION MULTIPLEX COMMUNICATION SYSTEMS

Filed Nov. 9, 1953 5 Sheets-Sheet 5

INVENTOR

Lionel R. F. Harris

BY Hall & Houghton

ATTORNEY

United States Patent Office 2,910,541

Patented Oct. 27, 1959

2,910,541

TIME-DIVISION MULTIPLEX COMMUNICATION SYSTEMS

Lionel Roy Frank Harris, Kenton, England, assignor to Her Majesty's Postmaster General, London, England Application November 9, 1953, Serial No. 391,020

Claims priority, application Great Britain November 19, 1952

7 Claims. (Cl. 179—15)

Figure 4:
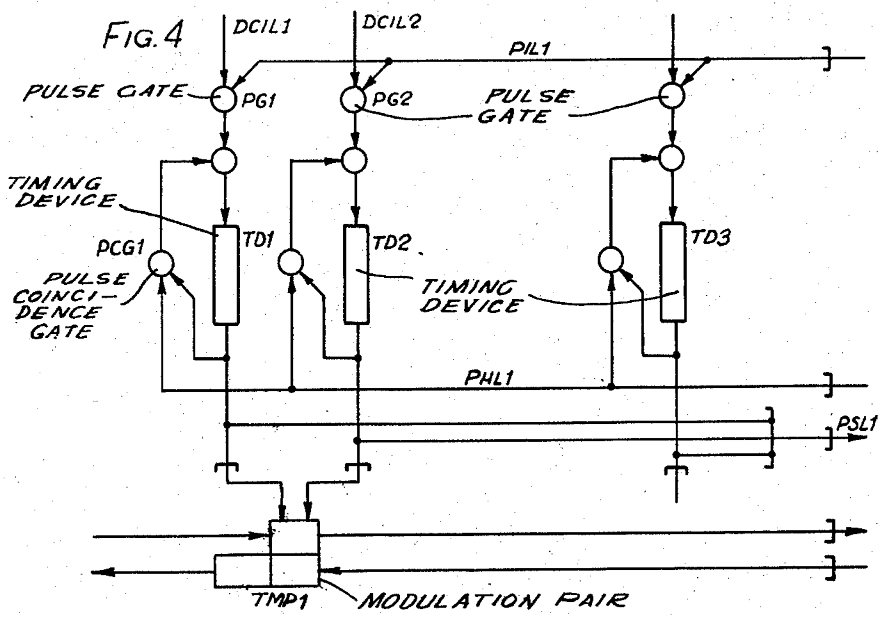

This invention relates to time division multiplex communication systems and more particularly to interconnections between the channels of a plurality of such systems. The invention may also be applied to automatic telephone exchange systems which employ time division multiplex transmission to effect the interconnection of circuits connected to the exchange.

In describing time-division multiplex systems a number of terms are used which will now be defined for the purposes of this specification. A pulse is a sudden change in current or voltage which lasts for a brief time. A train of equally time-spaced pulses constitutes a pulse train. A plurality of pulse trains is defined as a set of pulse trains and is equally time spaced if the pulse repetition frequency is the same for all pulse trains in the set and if the pulses of the pulse trains are interleaved at uniformly spaced time intervals. Two pulse trains are coincident if their pulse repetition frequencies are the same and the pulses of the two trains coincide in time. If the pulses of a plurality of pulse trains selected from a set of pulse trains are combined onto a single transmission channel, the resulting pulses are referred to as a combination of pulse trains.

Time division multiplex transmission comprises the transmission over a common channel of time-spaced pulse trains each constituting a multiplex channel and being modulated in amplitude, width or other characteristic for transmission over a transmit channel connected to the common channel by a multiplex transmitting modulator. A multiplex receiving modulator distributes the pulse trains received over the common channel to a plurality of receive channels each of which receives not more than one of the pulse trains. In systems for transmission over a distance it is usual practice for the numbers of transmit channels, multiplex channels and receive channels to be equal to one another and to maintain a fixed relationship to one another so that a transmit channel is permanently connected to one of the receive channels. Telephone exchange switching systems have been proposed which include switches employing time-division multiplex transmission for the purpose of interconnecting transmit and receive channels as required. In such switches the number of multiplex channels is equal to the number of transmit or receive channels but the number of receive or transmit channels respectively is determined by the trunking arrangements and the traffic to be carried and is usually less than the number of multiplex channels. The numbers of transmit and receive channels which may be interconnected by such switches are limited by the number of multiplex channels in the multiplex. The number of multiplex channels in any given system is inversely proportional to the pulse repetition frequency of the multiplex channels and the time-spacing of the multiplex channel pulse trains. Channel bandwidth sets a limit to the pulse repetition frequency and adjacent channel crosstalk to the time spacing so that in practice the number of multiplex channels is commonly limited to the order of 100. The numbers of transmit and receive channels which may be interconnected by each switch determine in part the number of ranks of switches and the number of switches in the ranks. The greater the number of transmit and receive channels which may be interconnected the less the numbers of switches in the ranks and, in general, the less the number of ranks of switches. One of the objects of the present invention is to increase the number of transmit and receive channels interconnected by a time division multiplex system having a given number of multiplex channels.

According to the present invention in a communication system including three or more time division multiplex bothway transmission means, each of which is connected to at least two or the remaining means by pulse gate circuits, communication between a multiplex channel on one of the means and another multiplex channel on another of the means, the two channels being synchronised, is effected by applying to the pulse gate circuit interconnecting the means, pulses coincident with those of the channels between which communication is being effected.

When the communication system includes at least two time division multiplex transmit transmission means and at least two time division multiplex receive transmission means, and each transmit transmission means is interconnected with each of at least two of the receive transmission means and each receive transmission means is interconnected with at least two of the transmit transmission means by pulse gate circuits, communication between a multiplex channel on a transmit transmission means and a multiplex channel on a receive transmission means, the two channels being synchronous, is effected by applying to the pulse gate circuit interconnecting the transmission means pulses coincident with those of the channels between which communication is being effected.

The communication system may comprise a number of circuits arranged in at least two groups, the circuits in each group being connected by modulators to a time division multiplex bothway transmission means individual to the group. The transmission means of each group is then interconnected by a pulse gate circuit with the transmission means of each of at least some of the remaining groups and communication between a circuit in one group and a circuit in one of said some of the remaining groups, the two circuits having coincident pulse trains applied to their modulators, is effected by applying to the pulse gate circuit interconnecting the transmission means of the two groups a pulse train coincident with said pulse trains.

In a particular application of the invention, each of the pulse gate circuits may be pulsed by a pulse train or pulse trains coincident with an invariable one or more of the multiplex channel pulse trains.

In a further application of the invention, each pulse gate circuit may be pulsed by a pulse train or pulse trains coincident with a variable one or more of the multiplex channel pulse trains.

Figure 1:
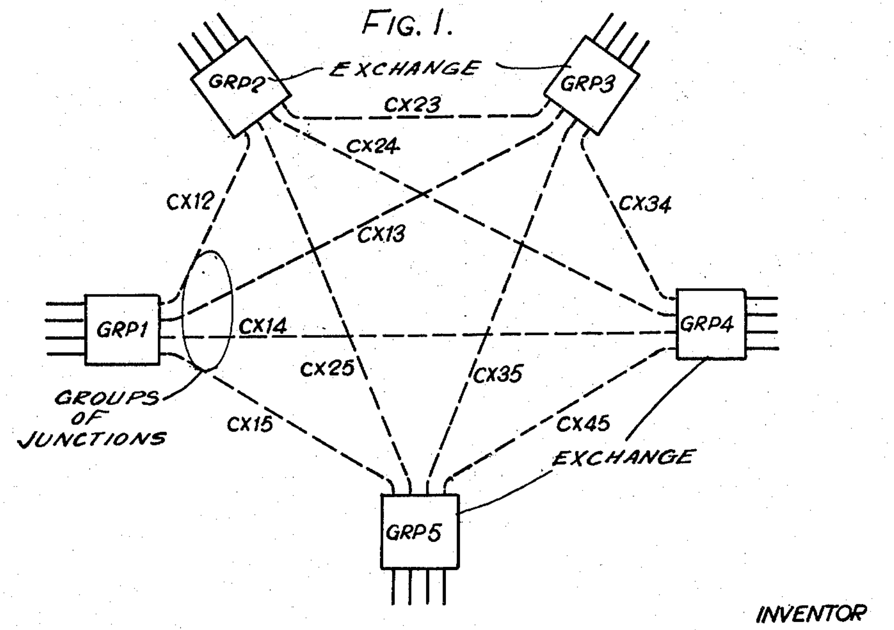
Figure 2:
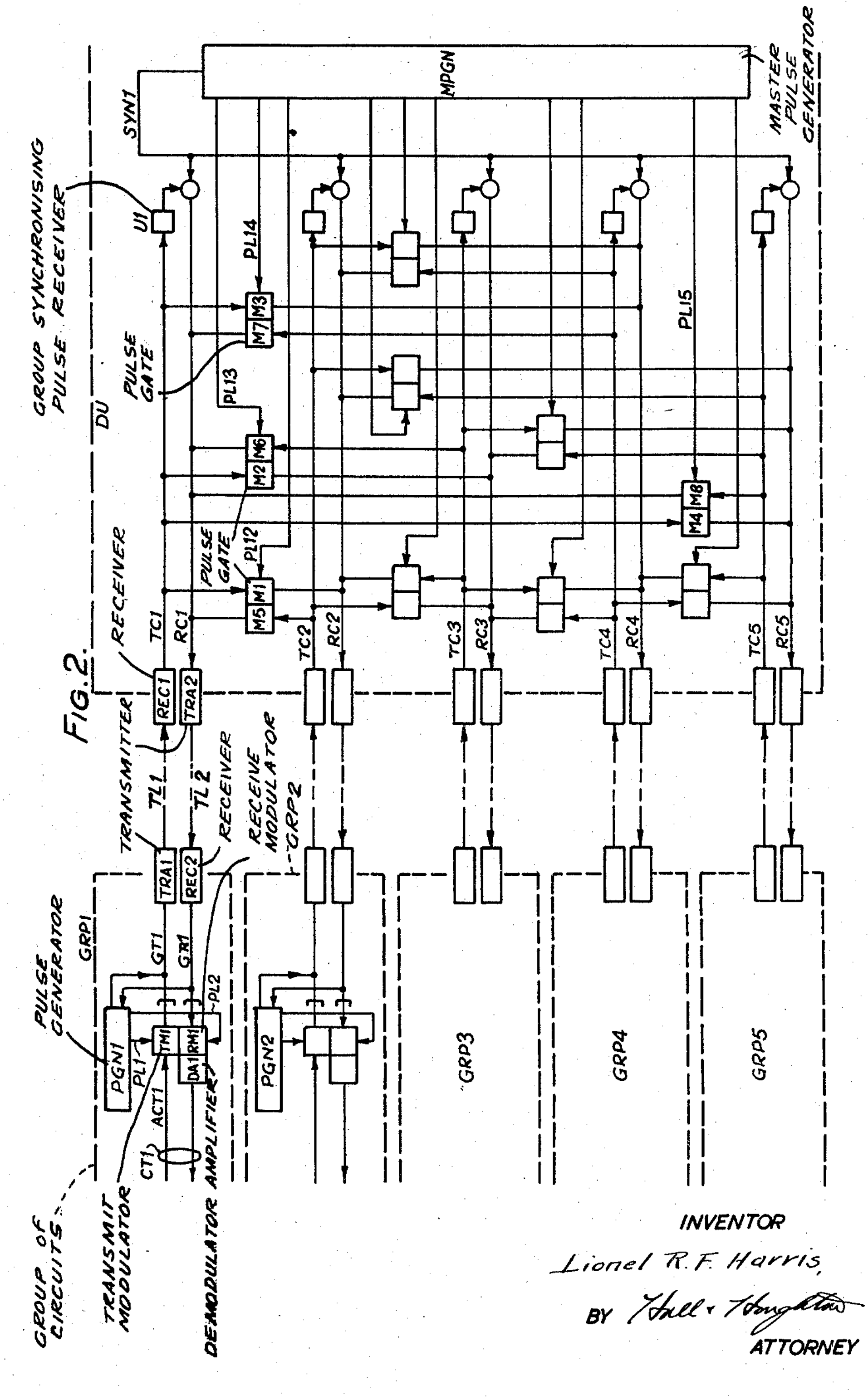
Figure 3:
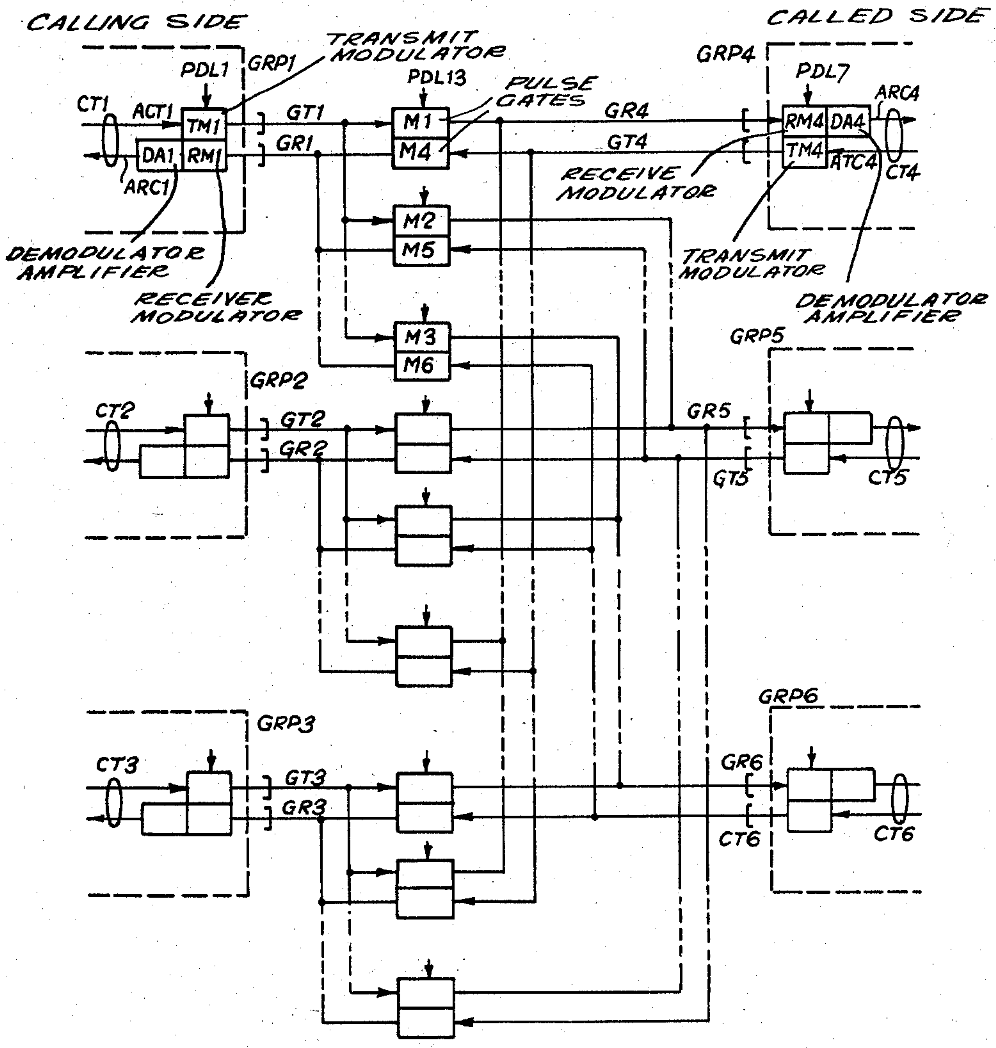
Figure 5:
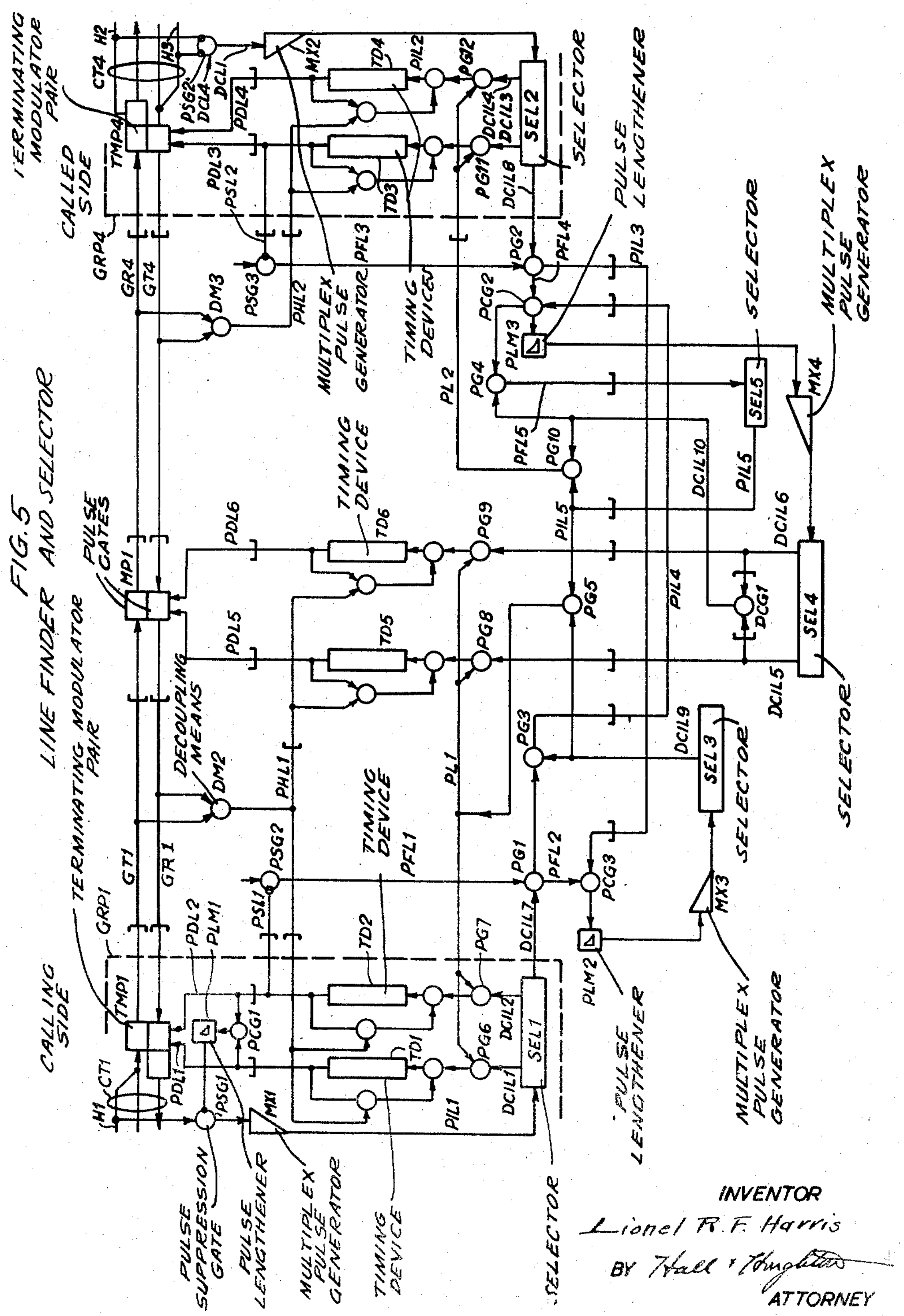
Figure 6:
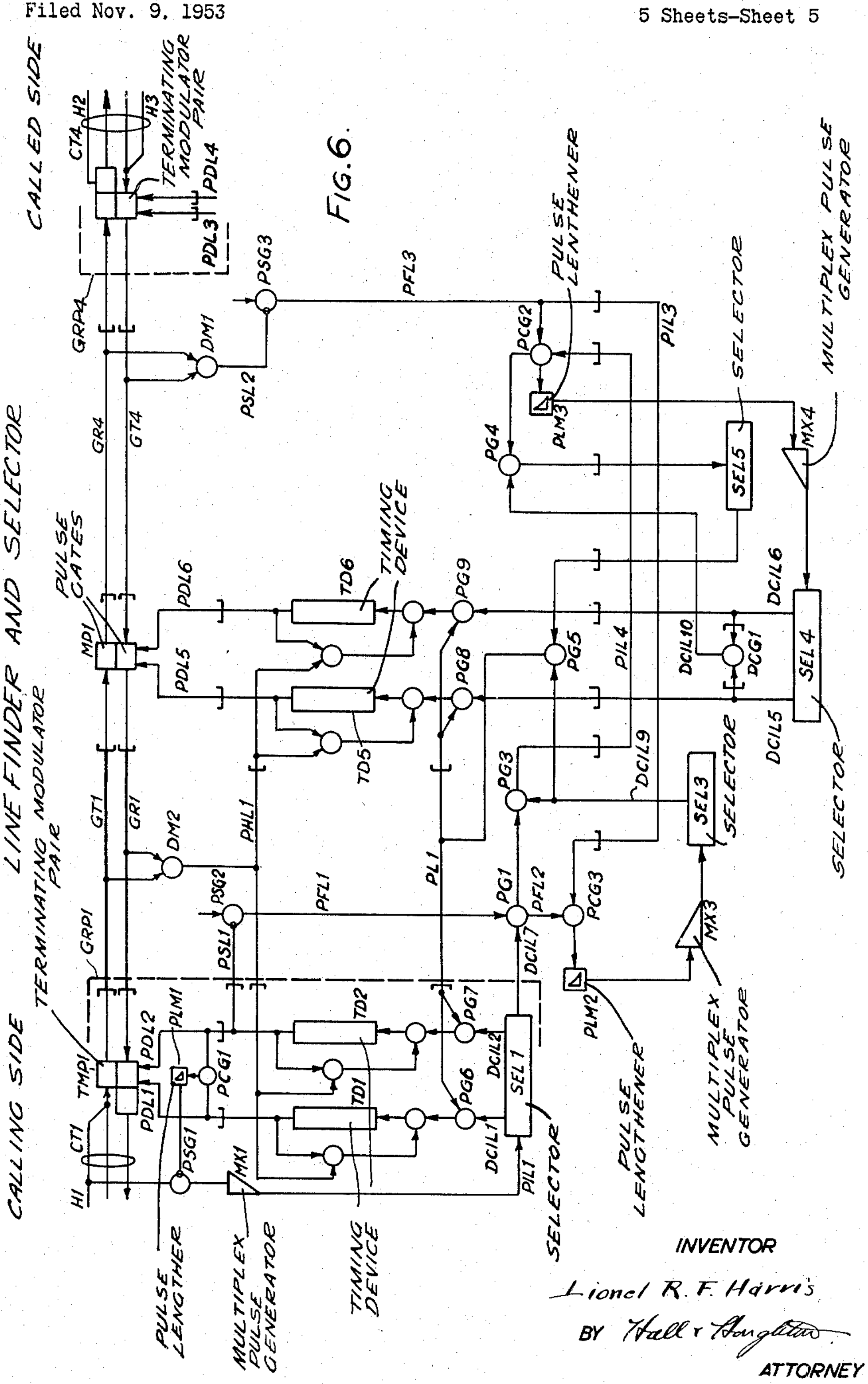

These and other features of the invention will be made clearer by descriptions of examples of the invention made with reference to the accompanying drawings of which Fig. 1 is a block schematic of interconnections between groups of circuits, Fig. 2 is a block schematic of interconnections between groups of circuits made through a common unit, Fig. 3 is a block schematic showing an arrangement of common channels and gate circuits suitable for line finding switches, Fig. 4 shows in diagrammatic form a pulse distributing system, Figs. 5 and 6 are block schematics of line finder switches.

The advantage of these systems of communication is that the same multiplex channel pulse train may be used for more than one connection through the system provided that coincident pulse trains are not required to be effective in more than one transmit or receive modulator in any one group of transmit or receive modulators. This implies that in T.D.M. electronic telephone exchange switches, for example, it is possible to have the condition in which any circuit on one side of the switch may be connected to any circuit on the other side of the switch and in which the number of simultaneous connections is not limited to the number of pulse trains which it is practicable to use on a single common channel and in which each connection consists of only one modulation from audio to pulse and one demodulation from pulse to audio. This is desirable as it reduces the number of modulation-demodulation stages required in connections between circuits in a telephone exchange and also reduces the number of audio links between switches required in an exchange. The techniques herein described are also applicable to complete telephone exchange systems in which connections between circuits involve only one modulation-demodulation stage.

Embodiments of the invention will now be described in which the connections through the system are bothway thus enabling information to be transmitted in both directions. One embodiment of the invention comprises a communication system in which there is a plurality of multiplex systems or groups of bothway circuits which are interconnected so that one or more of the circuits in a system or group are connected to one or more of the circuits in another system or group of circuits. Fig. 1 shows connections between five groups of circuits GRP1, GRP2, GRP3, GRP4 and GRP5. Connections are made between pairs of circuits in different groups and each dotted line in Fig. 1 represents a number, which may be 0, 1, etc., of connections between the groups. Thus CX12 represents a number of connections between a number of circuits in group GRP1 and the same number of circuits in group GRP2 and CX13 represents a number of connections between a number of other circuits in group GRP1 and the same number of circuits in group GRP3 and the other dotted lines similarly represent other groups of connections between groups of circuits.

Communication systems achieving those results are known. For example, it is known to interconnect telephone exchanges in this way and for such a system each group of connections between two groups of circuits represented by a dotted line in Fig. 1 corresponds to a group of junctions between two telephone exchanges.

In one embodiment of the present invention the circuits of each multiplex system or group of circuits are connected via multiplex modulators to two common channels, one for each direction of transmission, which are connected over suitable transmission media to a central distribution unit which may or may not be physically close to one of the groups of circuits. Fig. 2 shows the five multiplex systems or groups of circuits GRP1, GRP2, GRP3, GRP4, and GRP5 and the central distribution unit DU. The units associated with each group of circuits will be described with reference to the group GRP1 in which only one circuit CT1 is shown. Each circuit is assumed to be a 4-wire circuit at the point where it is connected to the communication system and as is known the 4-wire circuit may be converted to a two-wire circuit by means of, for example, a hybrid transformer. The two wire-transmit circuit ACT1 of CT1 in group GRP1 is conected to a transmit modulator TM1 which causes a pulse train applied to TM1 over lead PL1 to be modulated by the signal on transmit circuit ACT1 and to appear on a group common transmit channel GT1, common to all the circuits in the group GRP1. The pulse train applied to transmit modulator TM1 is a pulse train which is a member of a set of equally time-spaced pulse trains and which characterises the circuit CT1 in the group GRP1. A group common receive channel GR1, common to all the circuits in group GRP1 is connected to receive modulators associated with each circuit. Thus group common receive channel GR1 is connected to a receive modulator RM1 of circuit CT1 which selects the pulse train on channel GR1 which coincides with a pulse train applied to receive modulator RM1 over a lead PL2 and transmits it to a demodulator and amplifier DA1, the output of which is connected to the receive circuit ARC1 of circuit CT1. The pulse train applied to modulator RM1 constitutes a pulse train which is a member of a set of equally time-spaced pulse trains which is a delayed version of the set of pulse trains the corresponding member of which is applied to the transmit modulator TM1.

The common channels of each group are suitably connected to transmission means connecting the common channels to corresponding channels in the distributing unit DU. Thus channel GT1 of group GRP1 is connected to a common transmit channel TC1 in the unit DU via a transmitter TRA1, transmission means TL1 and receiver REC1 such that the pulse train or trains on channel GT1 appear after some time delay on channel TC1. Transmission means TL1 and TL2 need not take the same form as channels GT1, GR1, TC1 and RC1, for example, TL1 and TL2 may be radio links. Moreover amplifying means may be inserted at suitable points to restore the level where necessary. Similarly channel GR1 is connected to a common receive channel RC1 in unit DU via a transmitter TRA2, transmission means TL2 and a receiver REC2 such that the pulse train or trains on channel GR1 are delayed versions of those on channel RC1. As will be described later the pulse trains are so synchronised that the pulse trains characterising a particular circuit in group GRP1 are coincident on channels TC1 and RC1.

Similarly the circuits of other groups are connected by association with particular multiplex channel pulse trains to common channels corresponding to channels TC1 and RC1. Thus circuits in group GRP2 are connected to channels TC2 and RC2; in GRP3 to channels TC3 and RC3; in GRP4 to channels TC4 and RC4; and in GRP5 to channels TC5 and RC5.

The sets of multiplex channel pulse trains associated with the different groups of circuits are all synchronised so that in the distributing unit DU each multiplex channel pulse train in one set of pulse trains coincides with one multiplex channel pulse train in each of the other sets.

The common channels such as TC1 and RC1, of each group are connected via pulse gate circuits to the common channels of every other group. Thus channel TC1 is connected to channels RC2, RC3, RC4 and RC5 via gate circuits M1, M2, M3 and M4 respectively and channel RC1 is connected to channels TC2, TC3, TC4 and TC5 via gate circuits M5, M6, M7 and M8 respectively and similarly for the interconnections between other group common channels. Gate circuits M1 and M5 connect the common channels of group GRP1 and group GRP2 when pulsed by a pulse train or trains applied on lead PL12; gates M2 and M6 connect the common channels of group GRP1 and group GRP3 when pulsed by a pulse train or trains applied on lead PL13; M3 and M7 connect the common channels of group GRP1 and group GRP4 when pulsed by a pulse train or trains on lead PL14 and M4 and M8 connect the common channels of groups GRP1 and GRP5 when pulsed by a pulse train or trains on lead PL15 and similarly for the other interconnections. The pulse trains applied to the pulse gates are coincident with the multiplex channel pulse trains characterising the pairs of circuits in different groups which are to be connected together. Thus a circuit in one group, for example, circuit CT1 of group GRP1 characterised by one multiplex channel pulse train on channels TC1 and RC1 is connected to a circuit in one of the other groups for example of group GRP2 characterised by a coincident multiplex channel pulse train on channels TC2 and RC2 by the application of a coincident pulse train on lead PL12 to gates M1 and M5. By arranging the pulse trains applied on pulse leads such as PL12, different multiplex channels of a group may be connected to the multiplex channels of different groups such that a number of connections exist between the circuits in one group and the circuits in each of the other groups.

The pulse trains applied to the various pulse gate circuits and modulators must be synchronised if the appropriate pulse trains are to be transmitted through the appropriate gates and modulators at the appropriate times. This may be achieved by transmitting synchronising signals to and from the groups of circuits and the distributing unit. Thus, for example, a pulse generator MPGN may act as the master pulse generator for the whole system and it may be used to distribute the pulse trains to the pulse gate circuits interconnecting the common channels of the various groups and also to distribute synchronising or clock pulses to the pulse generators PGN1, PGN2 . . . PGN5 associated with the groups GRP1, GRP2 . . . GRP5 respectively. These synchronising pulses appearing on a lead SYN1 may be connected via a synchronising channel to the group pulse generators either on an independent and separate transmission medium or they may be applied to the common receive channels of the various groups as shown in Fig. 2. They would in that case be of different amplitude, phase, shape, width or other characteristic from the pulses of the multiplex channel pulse trains so that they may be detected by suitable apparatus in the pulse generators of the group. The pulses so generated may be used in the group pulse generators to control the repetition frequency and timing of the pulse trains applied to the receive modulator of the circuits in the group.

If the delay time for the transmission of pulse trains over the transmission means such as TL1 and TL2 is constant the time relationship of the pulse trains applied to the receive and transmit modulators will be fixed and the pulse trains applied to the transmit modulators can be delayed versions of those applied to the receive modulators. If however the time delay is not fixed because of variations in the delay of the transmission medium or a change in the distance between the groups and the distributing units, further information is required in order to apply pulses to the transmit modulators at the appropriate times. This may be achieved by causing the group pulse generators to transmit a synchronising pulse, say once in every cycle, to the distributing unit, that pulse having different amplitude, phase, shape, width or other characteristic from the pulses of the multiplex channel pulse trains so that it may be detected at the distributing unit DU in units such as U1 for group GRP1. That unit then transmits further characteristic pulses back to the group pulse generator the time delay of which indicates the delay of the transmission means thus enabling the pulse trains applied to the transmit modulators of the group to be synchronised to occur at the appropriate time in advance of the pulse trains applied to the receive modulators.

The pulse trains to be applied to the gate circuits M1, M2 . . . are determined by the circuits in different groups which are to be placed in connection. This is normally predetermined so that the pulse generator MPGN has to generate a series of pulse trains which are applied over the leads PL12, PL13 . . . to the gate circuits M1, M2 . . . in accordance with the required end of connection between the circuits in different groups. Changes in the connection between the circuits can thus only be effected by changing the distribution of the pulse trains emanating from generator MPGN. It will be understood that the generator MPGN may take any desired form. It may, for example, comprise a number of independent pulse generators.

It will be clear to those skilled in the art that these synchronizing pulses may occur at times such that they do not interfere with any of the multiplex channel pulses transmitted over the transmission means. It will also be clear that there are many ways in which this embodiment of the invention may be carried into effect.

A second embodiment consists of a switch for use in an automatic telephone exchange in which circuits on one side of the switch may call for connection to any free circuit on the other side of the switch.

Fig. 3 shows the arrangement of common channels and modulators upon which the embodiment is based. The circuits on the calling side of the switch are arranged in groups, three of which are shown in Fig. 3, and in each of the groups one circuit is shown. Thus, circuit CT1 is in group GRP1; circuit CT2 is in group GRP2 and circuit CT3 is in group GRP3. The calling circuits may be circuits coming from outside the exchange, for example subscribers' lines, circuits of a P.B.X group, junction circuits etc. or they may be circuits within the exchange connecting the switches of one stage to switches of another. In each case it will be assumed that the circuits are four-wire at the point where they are connected to the switch. As will be well known to those skilled in the art a four-wire circuit may be converted into a two-wire circuit, by, for example, a hybrid transformer. It will also be assumed that the circuits which are calling for connection through the switch or are already connected through the switch indicate these conditions by a D.C. holding signal on a lead individual to the circuit. This signal may be derived for example from an alternating current hold signal or from the D.C. change in potential on one lead of a subscriber's line when his loop is completed. The presence of a pulse train may be recognized by detecting a harmonic or harmonics of the pulse repetition frequency of the pulse train. The detected harmonic or harmonics is or are rectified and used to control an oscillator so that the latter generates an alternating current signal only when the pulse train is present.

Each circuit on the calling side of the switch is connected via a pair of modulators to a pair of common channels individual to the group. Thus, the transmit channel ACT1 of circuit CT1 in group GRP1 is connected via a transmit modulator TM1 to a common transmit channel GT1 of the group when modulator TM1 is pulsed by a pulse train applied over pulse lead PDL1. Similarly the receive channel ARC1 of circuit CT1 is connected via a receive modulator RM1 to the common receive channel GR1 of group GRP1 when modulator RM1 is pulsed by a pulse train on lead PDL1. Demodulation and amplifying means DA1 are interposed between modulator RM1 and channel ARC1 such that the audio signal which modulates the pulse train received via modulator RM1 is received at substantially the same level as the original modulating signal and appears on channel ARC1. Each circuit in group GRP1 is similarly connected via pairs of modulators to common channels GT1 and GR1. Each circuit in group GRP2 is connected to common channels GT2 and GR2 and each circuit in group GRP3 is connected to common channels GT3 and GR3.

On the called side of the switch the circuits are also arranged in groups, three of which are shown in Fig. 3 and in each of which one circuit is shown. Thus circuit CT4 is in group GRP4; circuit CT5 is in group GRP5 and circuit CT6 is in group GRP6. Again each circuit is associated with a pair of modulators and a receive demodulator and amplifier used for connecting the circuit with the pair of channels common to all the circuits in the group. Thus, circuit CT4 in group GRP4 has its transmit channel ATC4 connected via a transmit modulator TM4 to a common transmit channel GT4 and its receive channel ARC4 is connected via a receive modulator RM4 and demodulator and amplifier DA4 to a common receive channel GR4. The receive and transmit modulators connect the common channels to the demodulator and transmit channel respectively only when pulsed by a pulse train applied over a lead PDL7. Similarly the circuits in group GRP5 are connected to common channels GR5 and GT5 and the circuits of group GRP6 are connected to common channels GR6 and GT6. It will be understood that although in Figure 3 three groups of circuits are shown on the called side of the switch, there would, in general, be a number of groups less than the number of groups of circuits on the calling side of the switch.

Each pair of common channels on the calling side of the switch is connected to each pair of common channels on the called side of the switch via a pair of gate circuits hereinafter called gates which when pulsed by suitable pulse trains connect the common channels together. Thus common transmit channel GT1 of group GRP1 is connected to common receive channels GR4, GR5 and GR6 of groups GRP4, GRP5 and GRP6 respectively via gates M1, M2 and M3 respectively. Similarly receive channel GR1 of group GRP1 is connected to common transmit channels GT4, GT5 and GT6 via gates M4, M5 and M6 respectively. Common channels GT1 and GR1 are connected to common channels GR4 and GT4 when the pair of gates M1 and M4 is pulsed by a pulse train or trains applied over pulse lead PDL13. Similarly any pair of common channels on the calling side may be connected to any pair of channels on the called side by pulsing the pair of gates connecting them.

Connection between a calling circuit and a called circuit is established by causing coincident pulse trains to be effective in the modulators of the calling circuit, the modulators of the called circuit and the gates connecting the common channels of the group including the calling circuit to those of the group including the called circuit. The pulses used for a connection through the switch constitute one pulse train of a set of equally time spaced pulse trains. To transmit speech signals satisfactorily the pulse trains may have, for example, a pulse repetition frequency of 10 kc./sec. and pulse duration of 0.8 microsecond giving 100 pulse trains in the set.

In time division multiplex communication systems it is common to transmit pulses over the common channels which are of shorter duration than the pulses effective in the modulators. This is achieved by inserting a further gate in a common channel to which a train of short pulses is applied over a pulse lead. The pulse train so applied consists of pulses which are coincident with but of shorter duration than all the pulses in the set of equally time spaced pulse trains used for connections. One effect of reducing the pulse duration of the transmitted pulses is the reduction of adjacent channel cross talk and since in receive modulators short pulses are gated by longer pulses, slight delays through the system will not cause such large changes in the audio-audio transmission equivalent of a connection as would result if the common channel and gating pulses were of equal duration. This technique is applicable to embodiments of this invention. It will also be clear that common amplifiers may be inserted in the common channels where required.

In order to be able to vary the connections through the switch it is necessary to be able to cause any of the pulse trains in the set of pulse trains to be made effective in at least some of the pairs of modulators. Each pair of modulators is supplied with pulses over a pulse lead and it is clearly necessary to associate each pulse lead with a timing or storage device capable of generating any of the pulse trains in the set.

A technique which may be used for making pulses effective in a group of units will now be described with reference to Fig. 4 of the accompanying drawings. A plurality of pulses may be made effective in a plurality of units by associating with each unit or incorporating in each unit a coincidence gate to which pulse leads are applied such that only the pulses that coincide on all the pulse leads connected to the unit are effective in that unit and by arranging the pulse leads such that each unit is associated with a different combination of two pulse leads and associating each pulse lead with a pulse generating device synchronised by a storage device such that on the pulse lead appear those pulses required to be made effective in the units which it feeds.

This technique is applicable to this embodiment of the present invention since each group of pairs of modulators comprises a plurality of units in which one pulse train is required to be effective in only one unit at any particular time. The inter-group pairs of gates associated with a group also constitute a plurality of units in which the same pulse is not required to be made effective in more than one unit at a time and the same pulse distribution technique is therefore applicable.

Thus, a group of modulator pairs, one of which TMP1 is shown in Fig. 4 is associated with a set of timing devices which may be for example, mercury delay line circulating systems or any other suitable devices such as cathode ray tube storage systems or a magnetic storage system. Three of these devices TD1, TD2, and TD3 are shown in Fig. 4 and each modulator pair in the group is associated with its own individual unique combination of two of them. Thus modulator pair TMP1 is associated with timing devices TD1 and TD2 and the pulse outputs of these are connected to the pair of modulators TMP1. The modulators may be for example of the type described in the specification of copending patent application No. 276,306 and they may be arranged to connect circuits to common channels as described therein. That specification describes modulators which comprise at least one modulating circuit having a source of modulating signals shunted by a capacitance and in series connection with a first rectifier and has at least one second rectifier connected to that end of the or each first rectifier which is remote from the source of modulating signals and one or more sources of pulse train current and bias means adapted to render the first rectifier and the or each second rectifier nonconducting and conducting respectively in the absence of a pulse from the source or from any of the sources of pulse train current or of coincident pulses from two or more sources, the presence of a pulse or of the coincident pulses reversing the electrical conductivity of the rectifiers. The rectifiers may be of the same or of the opposite polarity in the series connection and the polarity of the bias means will be adjusted accordingly.

When a connection is set up through the switch it is necessary to make the pulse train to be used in that connection circulate in the timing devices, here assumed to be mercury delay line circulating systems, associated with the modulators involved in the connection. The method of indicating the appropriate delay lines will be described later but they may be indicated by a D.C. change in potential on leads associated with each delay line. Similarly the pulse train to be used may also be indicated on a pulse lead applied to the set of delay lines. Thus, in Fig. 4 when modulator pair TMP1 is to be involved in a connection, the combination of delay lines TD1 and TD2 associated with TMP1 is indicated by D.C. changes in potential on leads DCIL1 and DCIL2. The pulse train to be used is indicated over lead PIL1 and this pulse train is applied to the input gates associated with each circulating system and which are opened under the control of the aforementioned D.C. signals. Thus gate PG1 transmits the pulse train on lead PIL1 to circulating system TD1 when the circulating system is indicated by the D.C. change on lead DCIL1. Similarly the D.C. indicating signal on lead DCIL2 transmits the pulse train on lead PIL1 to circulating system TD2 via gate PG2. These signals initiate the production of coincident pulse trains in the indicated delay line circulating systems and the pulses continue to circulate after the D.C. indications have been removed from leads DCIL1 and DCIL2 and the marking pulses have disappeared from lead PIL1. The required pulse train is thus made effective in the appropriate pair of modulators. The pulse trains in the delay lines or similar devices may be maintained in circulation by applying coincident pulses to a common pulse maintaining lead applied to coincidence gates in the circulation paths. Thus pulse maintaining lead PHL1 is applied to gate PCG1 in the circulation path of delay line TD1. The technique used for maintaining the storage of the required pulse will clearly depend upon the storage device used.

Those pulse trains already in use in the group are indicated over pulse suppression lead PSL1 which is connected via suitable decoupling means to the outputs of all the circulating systems.

A basic problem in telephone exchange switching systems is the selection of one only of a number of circuits which are equally suitable for making a connection. In the specification of copending application No. 224,874 apparatus is described which may be used for the selection and indication of one circuit out of a group of circuits. As described in that specification each selecting means includes means generating a time spaced pulse train for each of the possible circuits in the group, means for producing the pulse trains of each of the equally suitable circuits on a common marking lead connected to a set of registering means such that one pulse of one pulse train is selected and operates one or a combination of registering means which is individual to the circuit from whose pulse train the pulse that operated the registering means was selected. Having operated to one such pulse, means are provided to prevent the operation of any further registering means. The fact that a combination of registering means has been operated and that the selection of a particular circuit associated with that combination has been made, may be indicated by causing the operated registering means to produce D.C. changes in potential on so called D.C. indicating leads. As described in the aforementioned specification the selected circuit may be marked by an individual D.C. indicating leads or by a unique combination of them. The selected circuit may also be indicated by the presence of the pulse train associated with the selected circuit on a so-called pulse indicating lead. These methods of indication will be referred to as D.C. indication and pulse indication respectively.

If a particular circuit is not to be among those from which a selection is to be made, for example, if it is already in use, then the pulses of the pulse train individual to the circuit must not be applied to the set of registering means. As described in the specification of copending patent application No. 224,874 this may be achieved by the application of a suitable potential over a D.C. inhibiting lead to the pulse generating means which prevents the generation of the unwanted pulse train. Alternatively the pulse train may be removed by the application of pulse suppression pulses to a pulse suppression gate in the common marking lead in which the unwanted pulses are suppressed. These methods will be referred to as D.C. suppression and pulse suppression respectively.

When suitable action has been taken as a result of the selection and indication by the selecting means described in the aforementioned specification, the registering means are released to enable a further selection to be made if necessary. If a registering means comprises a cold cathode thyratron, the set of registering means may be released by suitably reducing the voltage across the thyratrons until it is insufficient to maintain the discharge through them. This may be achieved by using a so-called pulse trigger operated a fixed time after the operation of the registering means or upon the disappearance of the pulse train associated with the selected circuit from the pulses on the common marking lead, or upon the receipt of a suitable releasing signal from some other source.

The basic techniques having now been described, further embodiments of the invention may be described in detail with reference to Figs. 5 and 6. The two diagrams show parts of two similar line finder switches and much of the apparatus described is common to both. The circuits on the calling side of the switch are arranged in groups and one such circuit CT1 in one group GRP1 is shown in Figs. 5 and 6 (hereinafter referred to as Fig. 5 unless otherwise specified). Each circuit has a pair of modulators, one for transmitting and one for receiving, the receiving modulator being connected to a demodulator and amplifier. For circuit CT1 these units TMP1 are connected to a pair of common channels GT1 and GR1 individual to the group GRP1 and have connected to them a combination of two pulse leads PDL1 and PDL2 in a set of pulse leads used in distributing pulses to the modulators in the group. Pulse leads PDL1 and PDL2 are connected to timing devices TD1 and TD2 respectively. If coincident pulses are applied over these leads a D.C. signal may be generated using pulse coincidence gate PCG1 and pulse lengthener PLM1 which indicates that circuit CT1 is already engaged in a connection. That D.C. signal is applied to suppression gate PSG1 which D.C. suppresses the holding signal appearing on a hold lead H1 unless it is calling for connection. The D.C. holding signal is removed from the D.C. output of gate PSG1 unless the circuit is calling for connection and has not been connected.

The DC output of PSG1 and that of all such gates within a group is applied to a multiplex pulse generator MX1 in which pulse trains may be generated, one for each of the circuits in the group. The pulse trains generated are those associated with calling circuits and these are applied over pulse indicating lead PIL1 to the group's circuit selecting means Sel 1. More than one circuit in a group may be calling for connection at any one time and as connections are set up in series a selection of one of the calling circuits in a group must be made. The selected circuit in the group is D.C. indicated on a combination of D.C. indicating leads individual to the selected circuit. Two of these DCIL1 and DCIL2 associated with circuit CT1 are shown in Fig. 5. The selecting means Sel 1 having been operated indicates that the associated group includes a calling circuit and this information is D.C. indicated over the group's individual lead DCIL7. Those pulse trains in the set of pulse trains used for connections through the switch which are already in use in the group, appear on pulse suppression lead PSL1 and are applied to pulse suppression gate PSG2 to which all the pulses of the pulse trains in the set are applied. On lead PFL1, the output lead of PSG2, appear the pulses of pulse trains which are suitable for use in a new connection to the group. These free pulses are applied to gate PG1 which is opened by the D.C. signal on lead DCIL7 only when the group includes a calling circuit to allow the free pulses to appear on lead PFL2 the output lead of PG1.

The circuits on the called side of the switch are arranged in groups and one such circuit CT4 in one group GRP4 is shown in Fig. 5. Each circuit has a pair of modulators, one for transmitting and one for receiving, the receiving modulator being connected to a demodulator and amplifier. For circuit CT4 those units TMP4 are connected to the pair of group common channels GT4 and GR4 individual to group GRP4 and are associated with a combination of two pulse leads PDL3 and PDL4 in a set of pulse leads used in distributing pulses to the modulators in the group. In the switch illustrated in Fig. 5 each pulse lead in the set is connected to a timing device, thus PDL3 and PDL4 are connected to timing devices TD3 and TD4 respectively. Associated with each circuit is a D.C. indicating lead such as lead DCL1 for circuit CT4 which indicates whether or not the circuit is busy. If a hold signal is present on either of the hold leads H2, H3 for either direction of transmission the D.C. supply on a lead DCL4 is suppressed in suppression gate PSG2 and no D.C. signal appears on lead DCL1. Lead DCL1 and all such leads of the group are connected to a multiplex pulse generator MX2 which generates pulse trains, one for each of the circuits in the group. The pulse trains actually generated are those associated with the circuits in the group, on the lead DCL1 of which D.C. signals are present and these pulse trains are applied over pulse indicating lead PIL2 to the group's circuit selecting means Sel 2. More than one circuit in a group may be free for connection at any time and as connections through the switch are set up one after the other and one at a time a selection of one free circuit in the group must be made. The selected circuit in the group is D.C. indicated on a combination of D.C. indicating leads individual to the selected circuit. Two of these, DCIL3 and DCIL4 associated with circuit CT4 are shown in Fig. 5. The selecting means Sel 2 having been operated indicates that the associated group includes a free circuit and this group is D.C. indicated on lead DCIL8. Those pulse trains are the set of pulse trains used for connections through the switch that are already in use in the group appear on pulse suppression lead PSL2 and this lead is connected to pulse suppression gate PSG3 to which all the pulse trains of the set are applied. On lead PFL3 the output lead of PSG3 appear the pulse trains suitable for use in a new connection to the group. These free pulse trains are applied to gate PG2 opened by the D.C. signal on lead DCIL8 such that only when the group includes a free circuit do the free pulse trains appear on lead PFL4 the output of PG2.

In the switch described with reference to Fig. 6 it is assumed that the number of circuits in a group of circuits on the called side of the switch is equal to the number of pulse trains in the set of pulse trains used for connections through the switch. There is then little advantage to be gained in making the pulse trains effective in the called side modulators variable and in the switch shown in Fig. 6 the pulse trains used for connections are permanently associated with the called circuit modulators. Those pulse trains may be applied to the modulators using, for example, techniques as described in the patent to Flowers, No. 2,632,880, issued March 24, 1953. The fact that the called circuits within a group are associated with fixed pulse trains for use in connections to them, means that the pulse trains on the common channels of a called group indicate the busy circuits within that group. Thus in group GRP4 those circuits that are busy and those pulse trains that are unsuitable for new connection to the group are both indicated on common channels GT4 and GR4 which may be connected via decoupling means DM1 to pulse suppression lead PSL2 may be applied to pulse suppression gate PSG3 to which all the pulse trains in the set are applied. On lead PFL3, the output lead of PSG3, appear the pulse trains of free circuits in the group and these are pulse trains which may be used in connections to the group.

In each type of switch, in order to complete a connection between a calling circuit and any free circuit on the called side it is necessary to select a pulse train which is free in the group that includes the calling circuit and also free in at least one of the called groups and to make the selected pulse train effective in all the modulators involved in the connection.

The free pulse trains of a called group are indicated on a lead similar to lead PFL3 of group GRP4 and these pulses are transmitted via suitable decoupling means to common pulse indicating lead PIL3 on which appear the pulse trains which are free in any of the called groups. Clearly any of these pulse trains may be used in a new connection provided they are free in a calling group. Lead PIL3 is connected to all the groups on the calling side of the switch and the pulses from PIL3 are compared with the free pulse trains in those groups which include a calling circuit. Lead PIL3 is connected to coincidence gates such as PCG3 which is associated with group GRP1, to which lead PFL2 is connected. If the group GRP1 includes a selected calling circuit and at least one free pulse train which is also free in at least one called group, pulse trains are transmitted through gate PCG3. A calling circuit in that group can thus be connected through the switch.

There may be more than one group which is in this condition and a selection of one only of them must be made. The output of PCG3 is pulse lengthened in pulse lengthener PLM2 and the resulting D.C. signal indicates that group GRP1 is among those from which a selection is to be made. The D.C. signal is applied to group selecting means comprising multiplex pulse generator MX3 and selecting means Sel 3. The selected group is D.C. indicated over a lead individual to the selected group. If group GRP1 is the selected group, it is indicated on lead DCIL9 which is connected to gate PG3. When gate PG3 is opened by the D.C. indicating signal on DCIL9, the free pulse trains on lead PFL2 are transmitted to common pulse indicating lead PIL4. On lead PIL4 appear the free pulse trains in the selected group of calling circuits. Lead PIL4 is connected to all groups on the called side of the switch and the pulse trains on it are compared in each called group with the free pulse trains in the called groups. Thus PIL4 is connected to coincidence gates one for each called circuit such as PCG2. For GRP4 and to gate PCG2 is connected the lead PFL4. If pulse trains are transmitted through gate PCG2, the group includes a suitable called circuit and has a free pulse train coincident with at least one of the free pulse trains in the selected calling group.

There may be more than one called group in this condition and a selection of one only of them must be made. The output of PCG2 is pulse lengthened in PLM3 and the resulting D.C. signal indicates that the called group is among those from which a selection can be made. The D.C. signal is applied to group selecting means comprising multiplex pulse generator MX4 and selecting means Sel 4. The selected called group is D.C. indicated on a combination of D.C. leads individual to the selected called group and also on a single lead individual to the selected called group. If group GRP4 is the selected called group this is indicated on the combination of leads DCIL5 and DCIL6 and via coincidence gate DCG1 to which DCIL5 and DCIL6 are applied, on lead DCIL10 individual to the selected called group GRP4.

Lead DCIL10 is connected to gate PG4 to which the output of coincidence gate PCG2 is connected. When the indication that group GRP4 has been selected appears on DCIL10 the pulse trains which are free in both the selected calling group and the selected called group are transmitted over lead PFL5 to pulse train selecting means Sel 5. There may be more than one common free pulse train and the selection of one only of them must be made by using Sel 5. The selected free pulse train is pulse indicated on lead PIL5 and this pulse train must be made effective in the modulators of the selected calling circuit, the selected called circuit and the gates connecting the common circuits of the selected calling group and the related called group.

The selected pulse train is applied to a gate associated with each calling group and one of these gates associated with the selected group is D.C. indicated from Sel 3 and is opened to transmit the selected pulse train to a pulse operating lead individual to the group. If GRP1 is the selected group, this is indicated on lead DCIL9 connected to PG5 to which lead PIL5 is also connected, and the selected pulse train is transmitted to pulse operating lead PL1. This lead is connected to gates associated with each timing device in the set of timing devices which distribute pulses to the modulators of the group. The particular combination of two of these which is D.C. indicated from the circuit selecting means are opened by the D.C. indication so that the selected pulse train is transmitted to operate the timing devices associated with the selected circuit in the selected group. Thus if the circuit selected is CT1, the D.C. indication appears on leads DCIL1 and DCIL2 connected to gates PG6 and PG7 respectively and these gates transmit the pulse train applied on PL1 to timing devices TD1 and TD2 respectively. These timing devices operate and the selected pulse train becomes effective in the modulators associated with the selected calling circuit. The pulse train will then be transmitted to common transmit channel GT1 so long as a hold signal is applied to the transmit modulator. The selected calling circuit will then indicate that it is busy on the output of pulse lengthener PLM1 so that it cannot be reselected. Similarly the selected pulse train will appear on pulse suppression lead PSL1 and this will prevent the reselection of the selected pulse train for connections to circuits in that calling group as previously described.

The pulse operating lead PL1 is also connected to gates associated with timing devices used for connections between the common channels of calling group GRP1 and the common channels of the called group GRP4. The pair of modulators MP1 used for connections between groups GRP1 and GRP4 have connected to them pulse leads PDL5 and PDL6 which are two pulse leads in a set of pulse leads used for distributing pulses to the pairs of gates connecting the common channels GT1 and GR1 of group GRP1 with the common channels of each of the groups on the called side of the switch. Each pulse lead in the set is connected to a timing device capable of generating any combination of pulse trains required in the pairs of modulators associated with it. Thus leads PDL5 and PDL6 are connected to timing devices TD5 and TD6 respectively. The combination of timing devices corresponding to the selected group on the called side is D.C. indicated from called group selecting means Sel 4. Thus if GRP3 is the selected called group, this is indicated by the D.C. potential on leads DCIL5 and DCIL6 which are each connected to gates associated with each calling group such that the pulse train appearing on the pulse operating lead of the selected calling group is transmitted to operate the indicated combination of timing devices in that group. Thus leads DCIL5 and DCIL6 are connected to gates PG8 and PG9 to which lead PL1 is also connected so that for the connection between groups GRP1 and GRP4 timing devices TD5 and TD6 are operated to generate the selected pulse trains.

The selected pulse train in thus made effective in the modulators of the selected calling circuit and in the modulators connecting the selected calling group to the selected called group. In the switch shown in Fig. 6 the selected pulse train identifies the selected called circuit in the selected called group and the pulse train is already effective in that circuit's modulators and the connection is thus set up through the switch. In the switch described with reference to Fig. 5 it is necessary to show how the selected pulse train is made effective in the timing devices associated with the selected called circuit.

The selected pulse train appearing on lead PIL5 is transmitted to gates associated with each called group and the one associated with the selected called group D.C. indicated from the called group selecting means Sel 4 is opened to transmit the selected pulse train to the pulse operating lead associated with the selected called group. Thus lead PIL5 is connected to gate PG10 in group GRP3 and PG10 transmits the selected pulse train to lead PL2 if gate PG10 is opened by an indicating signal on lead DCIL10. Lead PL2 is connected to gates associated with each of the timing devices used to distribute pulses to the modulators of the selected called group. The combination of these timing devices associated with the selected circuit in that group is D.C. indicated from the circuit selecting means in that group. Thus if circuit CT4 is the selected circuit, leads DCIL3 and DCIL4 are used to open gates PG11 and PG12 so that the selected pulse train that appears on lead PL2 operates timing devices TD3 and TD4 thus causing that pulse train to be effective in modulators TMP4 associated with circuit CT4.

The timing devices in a group of timing devices are associated with a group of circuits which are either on the calling or on the called side of a switch. The pulse trains generated by the timing devices are compared with those appearing on a pulse maintaining lead applied to them. The pulse maintaining lead is connected via suitable decoupling means to the common channels of the associated group. Thus common channels GT1 and GR1 are connected via decoupling means DM2 to pulse maintaining lead PHL1 and this lead is connected to the timing devices used to supply pulses to the modulators of the circuits in calling group GRP1 and to the modulators used in connecting the calling group GRP1 to the called groups. Similarly in the system shown in Fig. 5 common leads GT4 and GR4 are connected via decoupling means DM3 to pulse maintaining lead PHL2 which is connected to the timing devices used to supply pulses to the modulators of the circuits in group GRP4. For the duration of a connection through the switch a hold signal will be applied to one or both of the transmit modulators in the connection causing the pulse train used in that connection to appear on one or both of the common lead pairs used. These pulses are used to maintain the storage of the pulse train and thus the connection is held until both holds disappear.

Having set up a connection, the calling group selecting means called group selecting means, calling circuit selecting means, called circuit selecting means (if any) and pulse train selecting means may be released. These may be released, for example, a certain fixed time after they are operated or in the switch described with reference to Fig. 5 when the selected called circuit indicates that it has become busy by the disappearance of its indicating pulse on the output of the pulse generating means used to indicate the free circuits of a called group; alternatively in the switch described with reference to Fig. 6 the selecting means may be released upon the appearance of the selected pulse train on the receive common lead of the selected called group. Any indication may be used provided that it checks that the various selecting means are not released until the connection has been set up.

It will be clear to those skilled in the art that the invention has many applications other than those referred to in this specification and that many alternative techniques may be used to carry the invention into effect. In particular it will be clear that the pulse trains applied to the modulators of the calling circuits need not be variable and that each calling circuit in a group could be associated with a particular pulse train in the set, said pulse train being used for all connections to the circuit.

In each of the described embodiments of the invention each circuit is connected by a modulator to a T.D.M. bothway transmission means common to a group of circuits each such transmission means comprises a common transmit path and a common receive path. The bothway transmission means of one plurality of groups are each connected to the bothway transmission means of each of the other groups in the plurality or are each connected to each bothway transmission means of each group in a second plurality of groups. In either case communication between two circuits is effected via two bothway transmission means and a pair of gate circuits connecting them. The number of such gate circuits is thus equal to the product of the number of bothway transmission means in the first plurality of groups and the number of bothway transmission means to which each is connected. Irrespective of whether the connections through the system are fixed as with the system of Fig. 2 or variable as in the systems of Figs. 3, 5 and 6 the group of intermediate gate circuits connected to a common bothway transmission means performs the function of a switch which effects communication between a multiplex channel on said transmission means and a coincident channel on any of the other transmission means depending upon the gates which are pulsed at times coincident with said multiplex channel.

An economy in the number of intermediate gates can be made if the interconnecting is done in stages. For example the transmission means of the first plurality of groups of circuits could be arranged in groups, each bothway transmission means of each group being interconnected with a group of intermediate bothway transmission means individual to said group of transmission means and each intermediate transmission means could be interconnected with a group of those bothway transmission means to which interconnection is required so that access is obtained via intermediate transmission means between all pairs of transmission means requiring interconnection. Other stages of interconnection may be added if required. In each case communication between a pair of circuits is effected by suitably pulsing the intermediate gates used to connect together the transmission means used in the connection.

Depending upon the arrangements adopted the economy of intermediate gates may cause a reduction in the grade of service of the variable connection communication systems or a loss of flexibility of the possible communication arrangements of fixed connection systems.

It will be clear to those skilled in the art that the invention has many applications other than those referred to in this specification and that many alternative techniques may be used to carry the invention into effect. For example in the switches disclosed with reference to Fig. 3, the pulse trains applied to the modulators of the calling circuits need not be variable and that each calling circuit in a group could be associated with a particular pulse train in the set, said pulse train being used for all connections to the circuit. Further, the multiplex channels need not correspond to pulse trains in which the pulses are equally spaced in time for each channel.

I claim:

1. A communication system comprising in combination a number of incoming circuits arranged in a number of groups, a number of outgoing circuits arranged in a number of groups, a time division multiplex common signal circuit for each of said groups of circuits, modulators for each circuit connecting the circuit to the common signal circuit of the group containing the circuit, a source of time spaced pulses for each modulator and connected thereto for causing signals on the circuit to appear as a modulated channel pulse train, pulse gate circuits interconnecting each of the common signal circuits of incoming circuit groups with each of the common signal circuits of outgoing circuit groups, means for applying to the pulse gate circuits pulse trains synchronous with the channel pulse trains of circuits to be placed in communication, for each group of incoming circuits incoming circuit selecting means for selecting, one at a time, incoming circuits requiring connection to outgoing circuits, for each group of outgoing circuits, outgoing circuit selecting means for selecting an outgoing circuit for connection to a single selected incoming circuit, a pulse comparison circuit connected to the common signal circuit of the group containing a selected incoming circuit and to the common signal circuit of the group containing a selected outgoing circuit, pulse train selecting means connected to the output of said pulse comparison circuit and to the sources of time spaced pulses of said selected circuits and to the means for applying pulse trains to the pulse gate circuit interconnecting the common signal circuits of the two groups containing said selected circuits.

2. A communication system comprising in combination a number of incoming circuits arranged in a number of groups, a number of outgoing circuits arranged in a number of groups, a time division multiplex common signal circuit for each of said groups of circuits, a modulator for each circuit connecting the circuit to the common signal circuit of the group containing the circuit, a source of time spaced pulses for each modulator and connected thereto, pulse gate circuits connecting each of the common signal circuits of the incoming circuit groups to each of the common signal circuits of the outgoing circuit groups, means for applying pulse trains to the pulse gate circuits for placing circuits in communication, for each group of incoming circuits, incoming circuit selecting means for selecting, one at a time, incoming circuits requiring connection to outgoing circuits indicating means for supplying an indication from the incoming selecting means to incoming circuit group selecting means when the group contains an incoming circuit requiring connection, outgoing circuit group selecting means connected to said groups of outgoing circuits for selecting a group containing an outgoing circuit to which connection may be made, a first pulse transmission circuit for each group of incoming circuits controlled by said incoming circuit group selecting means, a second pulse transmission circuit for each group of outgoing circuits controlled by said outgoing circuit selecting means, a pulse comparison circuit connected to the first and second pulse transmission circuits, connected to said pulse comparison circuit selecting means pulse trains, said pulse train selecting means applying a single selected pulse train to the pulse source connected to the modulators of a selected incoming and outgoing circuit and to the pulse train applying means of the pulse gate circuit interconnecting the common signal circuits of the groups containing the selected circuits.

3. A communication system according to claim 1 and further comprising incoming circuit group selecting means receiving from each incoming circuit selecting means indication that the group contains a selected circuit, a first pulse transmission circuit controlled by the incoming circuit group selecting means to transmit channel pulse trains not in use in a selected group of incoming circuits, a pulse comparison circuit to which said channel pulse trains not in use are transmitted, an outgoing circuit group selecting means receiving an indication from the outgoing circuit selecting means that an outgoing circuit group contains a selected outgoing circuit, a second pulse transmission circuit controlled by said outgoing circuit group selecting means to transmit channel pulse trains not in use in the selected group of outgoing circuits to a said pulse comparison circuit, pulse train selecting apparatus connected to said pulse comparison circuit for selecting a pulse train not in use in both selected groups and applying it to the pulse source of the modulators of the selected incoming and outgoing circuits and to the means for applying pulse trains to the pulse gate circuit connected the common signal circuits of the selected groups of circuits.

4. A communication system comprising in combination a plurality of circuits arranged in a number of groups, a time division multiplex common signal circuit for each group, modulators connecting each circuit to the time division multiplex common signal circuit of the group containing the circuit, means for allotting to each pair of circuits to be placed in communication one pulse train of a series of pulse trains, pulse gate circuits interconnecting each time division multiplex common signal circuit with every other time division multiplex common signal circuit, a pulse applying circuit for each modulator and pulse gate circuit and means for energising said pulse applying circuits connected to the modulators of circuits to be placed in communication and the pulse gate circuit interconnecting the time division multiplex common signal circuits of the groups containing said circuits to be placed in communication in response to said allotting means to apply pulse trains coincident with said one pulse train.

5. A communication system comprising in combination a plurality of circuits arranged in a number of groups, a time division multiplex common signal circuit for each group, a modulator and a demodulator connecting each circuit with the time division multiplex common signal circuit of the group containing the circuit, a pulse train source for each circuit supplying the same channel pulse train to the modulator and demodulator of the circuit, a plurality of pulse gate circuits for each time division multiplex common signal circuit, said pulse gate circuits receiving an input from the time division multiplex common signal circuit and having a plurality of outputs each of which is connected to a different one of the other time division multiplex common signal circuits, a pulse train source for each pulse gate circuit and means for allotting to each pair of circuits to be placed in communication one channel pulse train only from a series of time spaced pulse trains.

6. A communication system comprising in combination a plurality of time division multiplex common signal circuits each comprising a number of communication channels each characterised by a pulse train of a series of time spaced pulse trains, and, for each common signal circuit, a plurality of pulse gate circuits interconnected between the time division multiplex common signal circuit and others of said time division multiplex common signal circuits and a pulse train source for each coincidence gate circuit whereby a communication channel of one time division multiplex common signal circuit is placed in communication with a coincident communication channel of another time division multiplex common signal circuit when said pulse train source of the pulse gate circuit interconnecting the two time division multiplex common signal circuits generates a pulse train coincident with those characterising the coincident communication channels.

7. A communication system comprising in combination a plurality of circuits arranged in a number of groups, a time division multiplex common signal transmit circuit and a time division multiplex common signal receive circuit for each group, for each circuit, a modulator and demodulator connecting the circuit to the common signal transmit circuit and common signal receive circuit respectively of the group containing the circuit, pulse train sources for each circuit connected to the modulator and demodulator thereof, a plurality of pulse gate circuits each of which is connected to one of the common signal transmit circuits and one of the common signal receive circuits, a pulse source for each pulse gate circuit, means for allotting a pulse train to each pair of circuits to be placed in communication and for causing pulse trains coincident with said allotted pulse train to be generated by the pulse train sources connected to the modulator of one circuit, the demodulator of the other circuit and the pulse gate circuit connected between the common signal transmit circuit of the group containing said one circuit and the common signal receive circuit of the group containing said other circuit.

References Cited in the file of this patent

UNITED STATES PATENTS

| | | |
|---|---|---|
| 2,547,001 | Grieg | Apr. 3, 1951 |
| 2,577,141 | Mauchly et al. | Dec. 4, 1951 |
| 2,619,548 | Lesti | Nov. 25, 1952 |
| 2,638,505 | Van Mierlo et al. | Mar. 12, 1953 |
| 2,649,505 | Ransom | Aug. 18, 1953 |
| 2,773,934 | Trousdale et al. | Dec. 11, 1956 |